United States Patent
Lacombe et al.

(10) Patent No.: US 8,894,842 B2
(45) Date of Patent: Nov. 25, 2014

(54) OPTIMIZED CATALYST FOR CATALYTIC REFORMING

(75) Inventors: Sylvie Lacombe, Vernaison (FR); Malika Boualleg, Villeurbanne (FR); Eric Sanchez, Saint Genis Laval (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 220 days.

(21) Appl. No.: 13/274,509

(22) Filed: Oct. 17, 2011

(65) Prior Publication Data

US 2012/0091038 A1 Apr. 19, 2012

(30) Foreign Application Priority Data

Oct. 15, 2010 (FR) ...................... 10 04051

(51) Int. Cl.
| | | |
|---|---|---|
| *C10G 35/06* | (2006.01) | |
| *C10G 35/085* | (2006.01) | |
| *C10G 35/09* | (2006.01) | |
| *B01J 27/13* | (2006.01) | |
| *B01J 27/053* | (2006.01) | |
| *B01J 37/02* | (2006.01) | |
| *B01J 21/04* | (2006.01) | |
| *B01J 37/00* | (2006.01) | |
| *B01J 37/20* | (2006.01) | |
| *B01J 23/46* | (2006.01) | |
| *B01J 37/28* | (2006.01) | |
| *B01J 23/656* | (2006.01) | |
| *B01J 23/42* | (2006.01) | |
| *B01J 23/62* | (2006.01) | |

(52) U.S. Cl.
CPC ................. *C10G 35/09* (2013.01); *B01J 23/42* (2013.01); *B01J 37/0205* (2013.01); *B01J 21/04* (2013.01); *B01J 37/0207* (2013.01); *C10G 2300/305* (2013.01); *B01J 37/0009* (2013.01); *B01J 37/20* (2013.01); *B01J 23/468* (2013.01); *B01J 37/28* (2013.01); *B01J 23/6567* (2013.01); *B01J 23/626* (2013.01); *C10G 2300/1096* (2013.01)
USPC ........... 208/139; 208/134; 208/137; 208/138; 502/223; 502/224; 502/230

(58) Field of Classification Search
CPC .......... B01J 21/04; B01J 23/42; B01J 23/468; B01J 23/626; B01J 23/6567; B01J 37/009; B01J 37/0205; B01J 37/0207; B01J 37/20; B01J 37/28; C10G 2300/1096; C10G 2300/305; C10G 35/09
USPC .......... 208/133, 134, 137, 139; 502/100, 224, 502/229, 230, 208, 213, 216, 223, 226, 227, 502/228, 355
See application file for complete search history.

(56) References Cited

U.S. PATENT DOCUMENTS

| | | | | |
|---|---|---|---|---|
| 4,242,236 A | * | 12/1980 | Blakely | ......................... 502/439 |
| 4,246,095 A | * | 1/1981 | Antos | ........................... 208/139 |
| 4,425,222 A | | 1/1984 | Swan | |
| 2003/0220192 A1 | | 11/2003 | Tanev | |

FOREIGN PATENT DOCUMENTS

WO 84/02663 A1 7/1984

OTHER PUBLICATIONS

Search Report, dated May 10, 2011, issued in corresponding FR 10/04.051.

* cited by examiner

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

The present invention concerns an optimized reforming catalyst comprising at least platinum, at least one promoter metal selected from the group formed by rhenium and iridium, at least one halogen, and at least one alumina support with a low sulphur and phosphorus content.

22 Claims, No Drawings

OPTIMIZED CATALYST FOR CATALYTIC REFORMING

The present invention relates to an optimized reforming catalyst, and to its use in a process for reforming a hydrocarbon feed. The invention also relates to the use of an alumina support with a low sulphur and phosphorus content for the manufacture of a reforming catalyst. The invention is applicable to the technological field of refining, and more particularly to reforming.

The catalytic reforming process is a process which is very widely used by refiners to upgrade heavy gasoline obtained by distillation. Hydrocarbons in the heavy gasoline feed (paraffins and naphthenes) containing approximately 6 to 12 carbon atoms per molecule are transformed during this process into aromatic hydrocarbons or, or if not, into branched paraffins. Said transformation is carried out at high temperatures (of the order of 500° C.), at low to medium pressures (3.5 to $25 \times 10^5$ Pa) and in the presence of a catalyst. Catalytic reforming produces a reformate which can be used to improve the octane number of oil cuts. The reformate is primarily formed from C5+ compounds (containing at least 5 carbon atoms). That process also produces a hydrogen-rich gas, a fuel gas (formed by C1-C2 compounds) and liquefied gases (formed by C3-C4 compounds). Finally, coke is also formed, primarily by condensation of aromatic rings forming a solid, carbon-rich product which is deposited on the active sites of the catalyst. The reactions which produce the c1-C4 compounds (also known as C4−) and coke are prejudicial to the reformate yield and to the stability of the catalyst. It is important to seek to increase the activity of the catalysts to obtain high C5+ yields at as low a temperature as possible in order to maximize the cycle time of the catalyst. The high activity of the catalyst must be matched with as high a selectivity as possible, i.e. the cracking reactions resulting in light products containing 1 to 4 carbon atoms (C4−) must be limited.

Reforming catalysts are porous solids in the form of sticks, beads or grains and generally comprise pure alumina as the support, chlorine, platinum and at least one additional metal selected from the group formed by metals from groups 7, 8, 9, 10, 13 and 14. They are bi-functional catalysts, i.e. have two functions, one being metallic and one being acidic, each of the functions having a well-defined role in the activity of the catalyst. The metallic function essentially provides for dehydrogenation of the naphthenes and paraffins and for hydrogenation of the coke precursors. The acidic function provides for isomerization of the naphthenes and paraffins and cyclization of the paraffins. The acid function is provided by the support itself, usually a pure halogenated alumina. The metallic function is provided by a noble metal from the platinum family and at least one additional metal, principally tin for the continuous process (moving bed) and rhenium for the semi-regenerative process (fixed bed).

In addition to coke, such reforming catalysts are extremely sensitive to various poisons or inhibitors that are likely to degrade their activity, in particular nitrogen, metals and water. By being deposited on the surface of the catalyst, coke causes a loss of activity over time which results in higher operational temperatures, a lower reforming yield and a shorter cycle time. After a certain period, it is necessary to regenerate the catalyst to eliminate coke and poisons which have been deposited on the active sites. The regeneration of reforming catalysts essentially comprises a step for controlled combustion to eliminate the coke and an oxychlorination step which can possibly eliminate the poisons deposited on the catalyst, but essentially redisperses the metals and adjusts the acidity of the alumina by adding chlorine or organic chlorine-containing compounds in an oxidizing medium. The catalyst regeneration treatments are carried out under very severe conditions which may result in its degradation due to the high temperature and the presence of combustion water. Thus, it is important to seek to increase the resistance of the catalysts under regeneration conditions.

The presence of a halogen, generally chlorine, is vital so that the catalyst has a sufficient acidic function for the paraffin and naphthene isomerization reactions and for the paraffin cyclization reactions. Under reaction conditions, the chlorine content on the catalyst reduces due to the presence of water in the feed and in the reaction unit. The water entrains the most labile chlorine atoms, giving rise to a number of disadvantages. The eluted chlorine passes through the bed of catalyst and increases the quantity of chlorine on the catalyst located downstream of that bed. This means that the chlorine content on the catalyst is not homogeneous over the entire bed. Zones are created which have higher acidities and which promote cracking of hydrocarbons as well as coking of the catalyst. Continuous injection into the unit of chlorinated precursor is necessary in order to keep the chlorine content constant through the catalyst. This rate of injection is higher if the chlorine retention of the catalyst is poor. However, chlorine is a source of corrosion in a reforming unit. Thus, it is important to seek to increase the chlorine retention in a catalyst.

The Applicant has developed reforming catalysts starting from a sulphur-containing support with which metals and dopants are associated. These catalysts are described in application WO 2009/147313. One of the disadvantages of these catalysts is that chlorine retention is not optimized.

The present invention overcomes the disadvantages described above. Surprisingly, the Applicant has shown that reforming catalysts with an alumina support which includes small quantities of sulphur and phosphorus have better activity and are more stable. Further, they can be used to obtain a better yield of C5+ compounds. Thus, the catalysts of the invention have good selectivity. Their use in a reforming process has the advantage of being able to inject less chlorine into the reforming unit, thereby limiting the risk of corrosion and providing cost savings. The catalysts are more stable and more selective; coke formation is also reduced.

In a first aspect, an optimized reforming catalyst is provided which has improved catalytic performance and better chlorine retention. The optimized reforming catalyst of the invention comprises at least one alumina support with a low sulphur and phosphorus content, at least one halogen selected from the group formed by fluorine, chlorine, bromine and iodine, at least platinum and at least one promoter metal selected from the group formed by rhenium and iridium.

The term "low sulphur and phosphorus content" as used in the present invention means an alumina support with a sulphur content not exceeding 1200 ppm by weight with respect to the total weight of the support and a phosphorus content not exceeding 1% by weight of the total support weight, limits included.

The phosphorus content in the alumina support is in the range 0.04% to 1% by weight with respect to the total support weight. In a second variation of the invention, the phosphorus content in the alumina support is in the range 0.05% to 0.8% by weight with respect to the total support weight. In a third variation of the invention, the phosphorus content in the alumina support is in the range 0.07% to 0.65% by weight with respect to the total support weight.

The sulphur content in the alumina support is in the range 500 to 1200 ppm by weight with respect to the total support weight. In a second variation of the invention, the sulphur content in the alumina support is in the range 530 to 1150 ppm by weight with respect to the total support weight. In a third variation of the invention, the sulphur content in the alumina support is in the range 550 to 1100 ppm by weight with respect to the total support weight. In a fourth variation of the invention, the sulphur content in the alumina support is in the range 580 to 1050 ppm by weight with respect to the total support weight. In a C5+ variation of the invention, the sulphur content in the alumina support is in the range 580 to 950 ppm by weight with respect to the total support weight.

The platinum content with respect to the total weight of the catalyst is in the range 0.02% to 2% by weight, preferably in the range 0.05% to 1.5% by weight, more preferably in the range 0.1% to 0.8% by weight.

The halogen or halogens used to acidify the alumina support may represent 0.1% to 15% by weight with respect to the total catalyst weight, preferably 0.2% to 5% with respect to the total catalyst weight. Preferably, a single halogen is used, in particular chlorine. When the catalyst comprises a single halogen which is chlorine, the chlorine content is in the range 0.5% to 2% by weight with respect to the total catalyst weight.

The catalyst of the invention may also comprise at least one dopant metal selected from the group formed by gallium, germanium, indium, tin, antimony, thallium, lead, bismuth, titanium, chromium, manganese, molybdenum, tungsten, rhodium and zinc.

The quantity of each dopant metal with respect to the total catalyst weight is in the range 0 to 2% by weight, preferably in the range 0.01% to 1% by weight, preferably in the range 0.01% to 0.7% by weight.

The catalyst comprises one or more promoter metals which have the effect of promoting the dehydrogenating activity of the platinum. The promoter metals are selected as a function of the mode of use of the catalyst. Thus, when the catalyst is intended to be used in a fixed bed process, the catalyst may comprise at least one promoter metal selected from the group formed by rhenium and iridium.

The quantity of each promoter metal is in the range 0.02% to 10% by weight with respect to the total catalyst weight, preferably in the range 0.05% to 5% by weight, more preferably in the range 0.1% to 2% by weight.

Before being used in a reforming reaction, the catalyst of the invention undergoes a sulphurization step. The total sulphur content of the catalyst is in the range 700 to 1400 ppm, preferably in the range 800 to 1200 ppm and more preferably in the range 800 to 1100 ppm. The term "total sulphur content" as used in the present invention means the total quantity of sulphur present on the final catalyst obtained at the end of the sulphurization step; the sulphur may be in the sulphate form and/or in the form of sulphur in the reduced state.

The catalyst in the bed is in the form of particles which may be beads, extrudates, which may be poly-lobed, pellets or any other form in routine use. Preferably, the catalyst is in the form of extrudates.

In a second aspect, the invention concerns the use of an alumina support with a low sulphur and phosphorus content for the manufacture of a reforming catalyst.

The alumina support used for the manufacture of a reforming catalyst has a phosphorus content in the range 0.04% to 1% by weight with respect to the total support weight. In a second variation of the second aspect of the invention, the support used for the manufacture of a reforming catalyst has a phosphorus content in the range 0.05% to 0.8% by weight with respect to the total support weight. In a third variation of the second aspect of the invention, the support used for the manufacture of a reforming catalyst has a phosphorus content in the range 0.07% to 0.65% by weight with respect to the total support weight.

The alumina support used for the manufacture of a reforming catalyst has a sulphur content in the support in the range 500 to 1200 ppm by weight with respect to the total support weight. In a second variation of the second aspect of the invention, the support used for the manufacture of a reforming catalyst has a sulphur content in the range 530 to 1150 ppm by weight with respect to the total support weight. In a third variation of the second aspect of the invention, the support used for the manufacture of a reforming catalyst has a sulphur content in the range 550 to 1100 ppm by weight with respect to the total support weight. In a fourth variation of the second aspect of the invention, the support used for the manufacture of a reforming catalyst has a sulphur content in the range 580 to 1050 ppm by weight with respect to the total support weight. In a fifth variation of the second aspect of the invention, the support used for the manufacture of a reforming catalyst has a sulphur content in the range 580 to 950 ppm by weight with respect to the total support weight.

The alumina support with a low sulphur and phosphorus content of the invention (also termed the alumina support of the invention in the remainder of the text) may be obtained using the following processes. These processes are given by way of example and are not limiting in any way.

As an example, phosphorus and sulphur can be deposited on an alumina precursor. The phosphorus and sulphur are deposited using techniques which are known to the skilled person. As an example, the phosphorus may be deposited on the alumina precursor using an impregnation technique. The following solutions, given by way of (non-limiting) example, may be used as the phosphorus-containing solution: a solution of $H_3PO_4$, a solution of $(NH_4)_2HPO_4$, a solution of $Na_2HPO_4$, or a solution of $Na_3PO_4$. The sulphur may also be added to the alumina precursor using an impregnation technique. The following solutions, given by way of (non-limiting) example, may be used as the sulphur-containing solution: a solution of $H_2SO_4$, a solution of $Na_2SO_4$, or a solution of $K_2SO_4$. The phosphorus and sulphur may be introduced onto the alumina precursor separately or even simultaneously.

The alumina precursor employed for the preparation of the support of the invention is preferably selected from the group formed by hydrargillite, bayerite, boehmite, amorphous gels, and aluminas known as transition aluminas which comprise at least one phase taken from the group comprising the rho, chi, eta, gamma, kappa, theta and alpha phases. Preferably, said alumina precursor is a boehmite.

The support of the invention may also be obtained from a mixture of an acidic aluminium source and a basic aluminium source in order to precipitate a boehmite type aluminium monohydrate. The acidic aluminium source may, for example, be selected from at least one of the following compounds: aluminium chloride, aluminium sulphate and aluminium nitrate. The basic aluminium source may be selected from basic aluminium salts such as sodium aluminate or potassium aluminate. The reagents are normally used in the form of aqueous solutions. The aluminium hydrate is precipitated by controlling the pH as follows:

In a first step a), an aqueous solution of aluminium sulphate is added to a beaker simultaneously with an aqueous sodium aluminate solution at a pH in the range 6 to 10 and with stirring at 350 rpm (revolutions per minute). Mixing is carried out at a temperature which is held constant for the entire solution addition period: this temperature is in the range 40-70° C. The pH is also controlled while mixing the two solutions. The pH is controlled by selection of the flow rates and the concentrations of the two solutions introduced into the beaker. The solutions are added and mixed for a period of 20 to 50 minutes until the final concentration of alumina ($Al_2O_3$) of the precursor is in the range 30 to 50 g/l. Stirring means that the product from the reaction, i.e. the aluminium hydrate precipitate, can come into contact with the starting reagents which continue to be introduced into the beaker and with the already formed precipitate. These experimental conditions mean that a suspension of an alumina precursor or aluminium hydrate precipitate in the boehmite form can be obtained.

In a second step b), the suspension of alumina precursor is matured. This step is carried out with stirring at 350 rpm and at a temperature in the range 60° C. to 250° C. for a period of 5 minutes to 24 hours. The pH during this step is adjusted to between 8.5 and 10. During this maturation step, the pH is controlled by adding a base selected from the group formed by sodium hydroxide, potassium hydroxide, a quaternary ammonium hydroxide, ammonia, sodium aluminate and potassium aluminate.

In a third step c), the matured suspension is filtered. Filtration is carried out using filtration techniques which are well known to the skilled person. A filtration cake is obtained which is then washed with 3 to 6 times its volume of water. This washing step can eliminate certain unwanted impurities to obtain a sulphur-containing alumina precursor.

In a fourth step d), a solution containing phosphorus, non-limiting examples of which are a solution of $H_3PO_4$, or a solution of $(NH_4)_2HPO_4$, or a solution of $Na_2HPO_4$ or a solution of $Na_3PO_4$, is deposited onto the alumina precursor using an impregnation technique.

The alumina precursor comprising sulphur and phosphorus is used for the preparation of catalysts or supports for the reforming catalyst. This preparation consists of shaping said alumina precursor then calcining it (step e). Shaping may be carried out using any known method, such as mixing/extrusion, for example, shaping by the oil drop method, granulation, or compacting, or spray drying. The shaped alumina precursor comprising sulphur and phosphorus is then calcined at a temperature which is in the range 500° C. to 830° C. An alumina support with a low sulphur content is thus obtained.

The support of the invention has a specific surface area in the range 150 to 400 $m^2/g$, preferably in the range 150 to 300 $m^2/g$, more preferably in the range 160 to 250 $m^2/g$. The volume of pores with a diameter of less than 10 microns is in the range 0.2 to 1 cc/g, preferably in the range 0.4 to 0.9 cc/g. The mean diameter of the mesopores (pores with a diameter between 2 and 50 nm) is in the range 5 to 20 nm, preferably in the range 7 to 16 nm.

The catalyst of the invention may be prepared by depositing its various constituents on the alumina support comprising sulphur and phosphorus of the invention. Each constituent may be deposited on the alumina support of the invention before or after shaping it. The constituents may be introduced in succession in any order, from one solution or from distinct solutions. In this latter case, intermediate drying and/or calcining may be carried out.

The various constituents of the catalyst may be deposited using conventional techniques, in the liquid phase or in the gas phase, from appropriate precursor compounds. When deposition is carried out on the alumina support of the invention that has been shaped, the techniques employed may, for example, be dry impregnation, or excess solution impregnation. The washing and/or drying and/or calcining steps may optionally be carried out before each fresh impregnation step.

After shaping the support of the invention and depositing all of the constituents, a final heat treatment is carried out between 300° C. and 1000° C.; it may comprise just one step, preferably at a temperature of 400° C. to 900° C., and in an oxygen-containing atmosphere, preferably in the presence of free oxygen or air. This treatment corresponds to drying-calcining following deposition of the final constituent.

Platinum may be deposited using conventional techniques, in particular impregnation from an aqueous or organic solution of a platinum precursor or an aqueous or organic solution containing a platinum salt or compound. Examples of salts or compounds which may be used that may be cited are hexachloroplatinic acid, ammoniacal compounds, ammonium chloroplatinate, platinum chloride, platinum dicarbonyl dichloride and hexahydroxyplatinic acid. The ammoniacal compounds may, for example, be platinum II tetramine salts with formula $Pt(NH_3)_4X_2$, platinum IV halogenopentamine salts with formula $(Pt(NH_3)_5)X_3$, platinum tetrahalogenodiamine salts with formula $PtX_4(NH_3)_2X$, or platinum complexes with halogen-polyketones and halogenated compounds with formula $H(Pt(acac)_2X)$ in which the element X is a halogen selected from the group formed by chlorine, fluorine, bromine and iodine, preferably chlorine, and the group acac represents the residue with formula $C_5H_7O_2$ derived from acetylacetone. Examples of organic solvents that may be cited are paraffinic, naphthenic or aromatic hydrocarbons and halogenated organic compounds containing 1 to 12 carbon atoms per molecule, for example. Examples which may be cited are n-heptane, methylcyclohexane, toluene and chloroform. It is also possible to use mixtures of solvents. The platinum may be deposited at any time during the preparation of the catalyst. It may be carried out in isolation or simultaneously with the deposition of the other constituents, for example the promoter metal or metals.

The dopant or dopants and/or promoter or promoters may also be deposited using conventional techniques starting from precursor compounds such as halides, nitrates, sulphates, acetates, tartrates, citrates, carbonates, oxalates of the dopant metals or amine type complexes. Any other salt or oxide of these metals which is soluble in water, acids or any other appropriate solvent, is suitable for use as a precursor. Examples of such precursors which may thus be cited are perrhenic acid, perrhenates, chromates, molybdates and tungstates. It is also possible to introduce the dopant or dopants by mixing an aqueous solution of their precursor compound(s) with the support of the invention before shaping it.

The dopant or dopants and/or promoter or promoters may be deposited by means of a solution of an organometallic compound of said metals in an organic solvent. In this case, this deposition is carried out after depositing the platinum, for example, then the solid is calcined and reduction in pure or diluted hydrogen may optionally be carried out at high temperature, for example between 300° C. and 500° C. The organometallic compounds are selected from the group constituted by complexes of said promoter metal and hydrocarbylmetals such as alkyl, cycloalkyl, aryl, alkylaryl and arylalkyl metals. It is also possible to employ compounds of the alcoholate type or organohalogen compounds. Tetrabutyltin may in particular be cited in the case in which the dopant metal is tin, and triphenylindium when the dopant metal is indium. The impregnation solvent may be selected from the group constituted by paraffinic, naphthenic or aromatic hydrocarbons containing 6 to 12 carbon atoms per molecule and organic halogenated compounds containing 1 to 12 carbon atoms per molecule. Examples which may be cited are n-heptane, methylcyclohexane and chloroform. It is also possible to use mixtures of the solvents defined above.

The halogen, preferably chlorine, may be introduced into the catalyst at the same time as another metallic constituent, for example in the case in which a halide is used as the precursor of the metal from the platinum family, the promoter metal or the dopant metal.

The halogen may also be added by impregnating with an aqueous solution of the corresponding acid, for example hydrochloric acid, at any time during the preparation. A typical protocol consists of impregnating the solid in order to introduce the desired quantity of halogen. The catalyst is kept in contact with the aqueous solution for at least 30 minutes in order to deposit this quantity of halogen.

The chlorine may also be added to the catalyst of the invention by means of an oxychlorination treatment. Such a treatment may, for example, be carried out between 350° C. and 550° C. for two hours in a stream of air containing the desired quantity of chlorine and optionally containing water.

When the various precursors used in the preparation of the catalyst of the invention do not contain halogen or contain an insufficient quantity of halogen, it may be necessary to add a halogenated compound during the preparation. Any compound which is known to the skilled person may be used and incorporated at any of the steps for the preparation of the catalyst of the invention. In particular, it is possible to use organic compounds such as methyl or ethyl halides, for example dichloromethane, chloroform, dichloroethane, methylchloroform or carbon tetrachloride.

Before using it, the catalyst undergoes a treatment in hydrogen and a treatment with the aid of a sulphur-containing precursor in order to obtain an active and selective metallic phase. The procedure for this treatment in hydrogen, also known as reduction in hydrogen, consist of keeping the catalyst in a stream of pure or diluted hydrogen at a temperature in the range 100° C. to 600° C., preferably in the range 200° C. to 580° C., for 30 minutes to 6 hours. This reduction may be cathed out immediately after calcining, or later by the end user. It is also possible for the reduction of the dried product to be carried out directly by the end user. The procedure for treatment using a sulphur-containing precursor is carried out after reduction. It means that a sulphur-containing catalyst can be obtained with a total sulphur content which is in the range 700 to 1600 ppm with respect to the total catalyst weight, preferably in the range 800 to 1400 ppm and more preferably in the range 800 to 1300 ppm. The sulphur treatment (also known as sulphurization) is carried out using any method which is well known to the skilled person. As an example, the catalyst of the invention in the reduced form is brought into contact with a sulphur-containing precursor for 1 hour at a temperature in the range 450° C. to 580° C. in the presence of pure or diluted hydrogen. The sulphur-containing precursor may be dimethyldisulphide, hydrogen sulphide, light mercaptans, or organic sulphides such as dimethyldisulphide, for example.

Thus, in accordance with a non-limiting example, the catalyst may be prepared using a production process comprising the following steps:
1) preparing an alumina support comprising sulphur and phosphorus in accordance with steps a) to e) described above;
2) impregnating the alumina support comprising sulphur and phosphorus with at least one solution of at least one platinum precursor;
3) impregnating the support obtained in the preceding step with at least one solution of at least one precursor of a promoter metal;
4) impregnating the support obtained in the preceding step with at least one solution of at least one dopant metal; this step is optional;
5) drying and calcining the support obtained in the preceding step to obtain a catalyst in the oxide form;
6) reducing the catalyst in the oxide form obtained in the preceding step in hydrogen at a temperature in the range 100° C. to 600° C., for example, and for 30 minutes to 6 hours to obtain a reduced catalyst;
7) bringing the reduced catalyst obtained in the preceding step into contact with at least one sulphur-containing precursor, for example, for at least one hour at a temperature in the range 450° C. to 580° C.

Steps 2), 3) and 4), the order of which may be reversed, may be carried out simultaneously or successively. At least one of steps 2), 3) and 4) may be carried out before step e) for shaping the support.

In a third aspect, the invention concerns a reforming process in which a hydrocarbon feed is brought into contact with the catalyst of the invention and under reaction conditions for the production of aromatic compounds.

The reforming processes can increase the octane number of the gasoline fractions originating from the distillation of crude oil and/or from other refining processes. The processes for the production of aromatics provide bases (benzene, toluene and xylene) which can be used in petrochemistry. These processes are of supplemental interest since they contribute to the production of large quantities of hydrogen which is vital to the hydrotreatment processes of the refinery. These two types of process are distinguished by the choice of operating conditions and possibly by the composition of the feed.

The hydrocarbon feed contains paraffinic, naphthenic and aromatic hydrocarbons containing 6 to 12 carbon atoms per molecule. This feed is defined, inter alia, by its density and its composition by weight.

In accordance with the third aspect of the invention, the reaction conditions for contacting said hydrocarbon feed with said catalyst of the present invention are a temperature in the range 400° C. to 700° C., a pressure in the range 0.1 to 4 MPa and a mass flow rate of feed treated per unit mass of catalyst per hour in the range 0.1 to 10 $h^{-1}$. A portion of the hydrogen produced is recycled using a molar recycle ratio (flow rate of recycled hydrogen over flow rate of feed) in the range 0.1 to 8.

In a variation of the third aspect of the invention, the process for reforming gasoline in accordance with the invention is carried out in a fixed bed by bringing a hydrocarbon feed into contact with the catalyst of the invention at a temperature in the range 350° C. to 550° C., a pressure in the range 1 to 3 MPa, and an hourly space velocity in the range 0.5 to 6 $h^{-1}$. A portion of the hydrogen produced is recycled at a molar recycle ratio (flow rate of recycled hydrogen over the flow rate of the feed) in the range 2 to 7.

The invention will now be described using the following examples which are given by way of non-limiting illustration.

EXAMPLES

Example 1

Synthesis of Catalysts

1a) Preparation of Catalyst A (not in Accordance with the Invention)

The support was a gamma alumina from a commercially available boehmite known as Versal™ 250 which contains less than 20 ppm by weight of elemental sulphur (detection limit using X ray fluorescence).

20 g of this support was brought into contact with 100 $cm^3$ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 14 minutes at 520° C. (flow rate: 0.15 l/min under NTP conditions, i.e. normal temperature and pressure conditions).

The final catalyst contained 0.30% by weight of platinum, 0.35% by weight of rhenium, and 1.1% by weight of chlorine. It had a total sulphur content of 950 ppm by weight with respect to the total catalyst weight.

1b) Preparation of Catalyst B (not in Accordance with the Invention)

The support was a gamma alumina from a commercially available boehmite known as Versal™ 250 which contains less than 20 ppm by weight of elemental sulphur (detection limit using X ray fluorescence). This alumina was impregnated with an aqueous solution of phosphoric acid then dried. The concentration of phosphorus in the phosphoric acid solution was such that after calcining, the support had a phosphorus content of 0.25% by weight with respect to the total support weight.

20 g of this support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 14 minutes at 520° C. (flow rate: 0.15 l/min under NTP conditions).

The final catalyst contained 0.30% by weight of platinum, 0.35% by weight of rhenium, 1.1% by weight of chlorine and 0.25% of phosphorus. It had a total sulphur content of 950 ppm by weight with respect to the total catalyst weight.

1c) Preparation of Catalyst C (not in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried, extruded and calcined at 720° C. The washing step prior to spray drying was carried out in order to produce a sulphur content of 870 ppm by weight after calcining and before the sulphurization step.

20 g of this support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, and 1.1% by weight of chlorine. It had a total sulphur content of 950 ppm by weight with respect to the total catalyst weight.

1d) Preparation of Catalyst D (not in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. The concentration of phosphorus in the phosphoric acid solution was such that after calcining, the support had a phosphorus content of 0.25% by weight with respect to the total support weight. Next, the powder was extruded and calcined at 740° C. The washing step prior to spray drying was carried out in order to produce a sulphur content of 1250 ppm by weight on the support after calcining and before the sulphurization step.

20 g of this support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, 1.1% by weight of chlorine and 0.25% by weight of phosphorus. It had a total sulphur content of 1290 ppm by weight with respect to the total catalyst weight.

1e) Preparation of Catalyst E (not in Accordance with the Invention)

A gamma alumina support was obtained by simultaneously adding a solution of aluminium sulphate to a solution of sodium aluminate. The pH of the solution was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and dried at 740° C. The washing step prior to spray drying was carried out in order to produce a sulphur content of 450 ppm by weight on the support after calcining and before the sulphurization step. The concentration of phosphorus in the phosphoric acid solution was such that after calcining, the support had a phosphorus content of 0.25% by weight.

20 g of support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, 1.1% by weight of chlorine and 0.25% by weight of phosphorus. It had a final sulphur content of 990 ppm by weight with respect to the total catalyst weight.

1f) Preparation of Catalyst F (not in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and calcined at 780° C. The washing step prior to spray drying was carried out in order to produce a sulphur content of 870 ppm by weight on the support after calcining and before the sulphurization step. The concentration of phosphorus in the phosphoric acid solution was such that after calcining, the support had a phosphorus content of 1.30% by weight.

20 g of support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, 1.1% by weight of chlorine and 1.30% by weight of phosphorus. It had a final sulphur content of 950 ppm by weight with respect to the total catalyst weight.

1g) Preparation of Catalyst I1 (in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and dried at 740° C. The concentration of phosphorus in the phosphoric acid solution was such that after calcining, the support had a phosphorus content of 0.25% by weight. The washing step prior to spray drying was carried out in order to produce a sulphur content of 590 ppm by weight. Thus, after calcining and before sulphurization, the support had a sulphur content of 590 ppm by weight and a phosphorus content of 0.25% by weight with respect to the total weight of the support.

20 g of this support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 500° C. then reduced in hydrogen for 2 hours at 500° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, 1.1% by weight of chlorine and 0.25% by weight of phosphorus. It had a total sulphur content of 1020 ppm by weight of sulphur with respect to the total catalyst weight.

1h) Preparation of Catalyst I2 (in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and calcined at 740° C. The concentration of phosphorus in the phosphoric acid solution was such that after calcining, the support had a phosphorus content of 0.25% by weight. The washing step prior to spray drying was carried out in order to produce a sulphur content of 870 ppm by weight. Thus, after calcining and before sulphurization, the support had a sulphur content of 870 ppm by weight and a phosphorus content of 0.25% by weight with respect to the total weight of the support.

20 g of this support was brought into contact with 100 cm³ of an aqueous solution of hydrochloric acid and hexachloroplatinic acid comprising 0.07 g of platinum. The quantity of hydrochloric acid was adjusted in order to produce a chlorine content of 1.1% by weight in the final catalyst. The impregnation solution was then withdrawn. 60 cm³ of an aqueous solution comprising 0.11 g of rhenium introduced in the form of ammonium perrhenate was brought into contact for 3 hours with the support obtained at the end of the preceding step. The impregnation solution was then withdrawn. The catalyst obtained was dried for 1 hour at 120° C., calcined for 2 hours at 500° C. then reduced in hydrogen for 2 hours at 500° C. The catalyst was then sulphurized with a hydrogen/$H_2S$ mixture (1% by volume $H_2S$) for 9 minutes at 520° C. (flow rate: 0.15 l/min under NTP conditions).

The final catalyst contained 0.30% by weight of platinum, 0.35% by weight of rhenium, 1.1% by weight of chlorine and 0.25% by weight of phosphorus. It had a final sulphur content of 950 ppm by weight with respect to the total catalyst weight.

1i) Preparation of Catalyst I3 (in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and calcined at 740° C. The concentration of phosphorus in the phosphoric acid solution was such that after calcining, the support had a phosphorus content of 0.25% by weight. The washing step prior to spray drying was carried out in order to produce a sulphur content of 870 ppm by weight. Thus, after calcining and before sulphurization, the support had a sulphur content of 870 ppm by weight and a phosphorus content of 0.25% by weight with respect to the total weight of the support.

20 g of this support was brought into contact for 3 hours with 100 cm$^3$ of an aqueous solution of hydrochloric acid and indium nitrate comprising 0.03 g of indium and 0.2 g of chlorine. The impregnation solution was then withdrawn. The solid obtained was dried for 1 hour at 120° C. then calcined for 2 hours at 450° C. 100 cm$^3$ of an aqueous hexachloroplatinic acid solution comprising 0.07 g of platinum was then brought into contact for 3 hours with the support obtained at the end of the preceding step. The quantity of hydrochloric acid was adjusted in order to produce a chlorine content of 1.1% by weight in the final catalyst. The impregnation solution was then withdrawn. 60 cm$^3$ of an aqueous solution comprising 0.09 g of rhenium introduced in the form of ammonium perrhenate was then brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/H$_2$S mixture (1% by volume H$_2$S) for 9 minutes at 520° C. (flow rate: 0.15 l/min under NTP conditions).

The final catalyst contained 0.30% by weight of platinum, 0.30% by weight of rhenium, 0.10% by weight of indium, 1.1% by weight of chlorine and 0.25% by weight of phosphorus. It had a final sulphur content of 950 ppm by weight with respect to the total catalyst weight.

1j) Preparation of Catalyst I4 (in Accordance with the Invention)

A gamma alumina support was obtained by simultaneously adding a solution of aluminium sulphate to a solution of sodium aluminate. The pH was held at 9 while the two solutions were being mixed in order to obtain an alumina precursor with a final alumina concentration of 50 g/l. The slurry obtained was matured for 3 hours, keeping the pH at 9. It was then filtered, washed and spray dried. The powder obtained was impregnated with an aqueous solution of phosphoric acid then dried. It was then extruded and calcined at 740° C. The concentration of phosphorus in the phosphoric acid solution was such that after calcining, the support had a phosphorus content of 0.25% by weight. The washing step prior to spray drying was carried out in order to produce a sulphur content of 870 ppm by weight on the support after calcining and before the sulphurization step. After calcining and before sulphurization, the support thus had a sulphur content of 870 ppm by weight and a phosphorus content of 0.25% by weight with respect to the total support weight.

20 g of this support was brought into contact for 3 hours with 100 cm$^3$ of an aqueous solution of hydrochloric acid and tin (II) chloride comprising 0.045 g of tin and 0.2 g of chlorine. The impregnation solution was then withdrawn. The solid obtained was dried for 1 hour at 120° C. then calcined for 2 hours at 450° C. 100 cm$^3$ of an aqueous solution of hydrochloric acid and hexachloroplatinic acid comprising 0.07 g of platinum was then brought into contact for 3 hours with the support obtained at the end of the preceding step. The quantity of hydrochloric acid was adjusted in order to have a chlorine content of 1.1% by weight in the final catalyst. The impregnation solution was then withdrawn. 60 cm$^3$ of an aqueous solution comprising 0.09 g of rhenium introduced in the form of ammonium perrhenate was then brought into contact for 3 hours with the support obtained at the end of the preceding step. The impregnation solution was then withdrawn. The catalyst obtained was dried for 1 hour at 120° C., calcined for 2 hours at 520° C. then reduced in hydrogen for 2 hours at 520° C. The catalyst was then sulphurized with a hydrogen/H$_2$S mixture (1% by volume H$_2$S) for 9 minutes at 520° C. (flow rate: 0.15 l/min under NTP conditions).

The final catalyst contained 0.30% by weight of platinum, 0.30% by weight of rhenium, 0.15% by weight of tin, 1.1% by weight of chlorine and 0.25% by weight of phosphorus. It had a total sulphur content of 950 ppm by weight with respect to the total catalyst weight.

Example 2

Catalytic Tests

The catalysts A to F and I1 to I4 were tested for the transformation of a naphtha type hydrocarbon feed originating from oil distillation which had the following characteristics:

| Density at 15° C. | 0.747 | kg/dm$^3$ |
| Paraffins/naphthenes/aromatics | 57/32/11 | % vol. |

This transformation was carried out in a traversed bed pilot test unit in the presence of hydrogen. The test was carried out using the following operating conditions:
Total pressure: 1.2 MPa
Flow rate of feed: 3 kg per kg of catalyst per hour
Research octane number: 102
Molar ratio of recycled hydrogen to hydrocarbon feed: 3.5

The performances obtained after 180 h of operation are shown in Table 1, namely the temperature necessary to reach the desired research octane number, representing the activity of the catalyst, and the weight yields of C5+ reformate (hydrocarbons containing at least 5 carbon atoms) and C4− (hydrocarbons containing 1 to 4 carbon atoms), representative of the selectivity of the catalyst.

All of the catalyst tests were carried out at a variable temperature but such that a constant research octane number (RON) equal to 102 was obtained.

TABLE 1

| Catalyst | Temperature (° C.) | C5+ yield (wt %) | C4− yield (wt %) |
|---|---|---|---|
| A | 496.0 | 84.3 | 12.9 |
| B | 495.5 | 84.1 | 13.1 |
| C | 501.5 | 84.0 | 13.0 |
| D | 500.5 | 86.9 | 10.2 |
| E | 497.0 | 84.9 | 12.3 |
| F | 499.5 | 86.6 | 11.4 |
| I1 | 497.5 | 86.8 | 10.2 |
| I2 | 499.0 | 87.2 | 9.8 |
| I3 | 499.0 | 87.5 | 9.7 |
| I4 | 498.0 | 87.6 | 9.4 |

These results demonstrate the synergistic effect of phosphorus and sulphur when they are present in the support of the catalysts of the invention (catalysts I1 to I4) on the activity and selectivity of the reforming catalysts. In fact, the catalysts of the invention I1 to I4 have higher C5+ yields than the catalysts A, B and E, not in accordance with the invention, and C4- yields which are lower than the catalysts which were not in accordance with the invention. Thus, they have a higher selectivity than catalysts A, B and E. The catalysts of the invention are more active than catalysts C, D and F since catalysts I1 to I4 can be used to obtain the same research octane number (RON) at a lower temperature.

Example 3

Chlorine Retention Tests

Catalysts D and I1 to I4 underwent a chlorine retention test, which consisted of passing a stream of air containing 8000 ppm by weight of chlorine (in the form of hydrochloric acid) through the catalyst at a flow rate of 1 liter per hour per gram of catalyst at 520° C. for 1 hour. The chlorine content on the catalyst after the test (termed the final chlorine content) was compared with the initial chlorine content (before the chlorination test).

For each catalyst, the chlorine loss, defined as the ratio $(Cl_{initial}-Cl_{final})/Cl_{initial}$, is recorded in Table 2.

TABLE 2

| Catalyst | Initial chlorine content (wt %) | Final chlorine content (wt %) | Chlorine loss (%) |
|---|---|---|---|
| D | 1.09 | 0.79 | 28 |
| I1 | 1.09 | 0.96 | 12 |
| I2 | 1.11 | 0.91 | 18 |
| I3 | 1.11 | 0.90 | 19 |
| I4 | 1.10 | 0.90 | 18 |

These results show that the catalysts of the invention, I1 to I4, have a higher chlorine retention capacity compared with catalyst D, not in accordance with the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 10/04.051, filed 15 Oct. 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reforming catalyst comprising platinum, at least one promoter metal selected from the group formed by rhenium and iridium, at least one halogen selected from the group formed by fluorine, chlorine, bromine and iodine, and an alumina support modified by the inclusion of a sulphur and phosphorus content in the form of $PO_4$ and $SO_4$, wherein the sulphur content in the alumina support is in the range of 500 to 1200 ppm by weight with respect to the total support weight, and the phosphorous content in the alumina support is in the range of 0.04% to 1% by weight with respect to the total support weight, wherein the catalyst contains at least some of said sulphur and phosphorus in the form of $PO_4$ and $SO_4$.

2. A catalyst according to claim 1, further comprising at least one dopant metal selected from the group formed by gallium, germanium, indium, tin, antimony, thallium, lead, bismuth, titanium, chromium, manganese, molybdenum, tungsten, rhodium and zinc.

3. A catalyst according to claim 1, in which the phosphorus content is presently only in the alumina support and is in the range of 0.05% to 0.8% by weight with respect to the total support weight.

4. A catalyst according to claim 1, in which the phosphorus content in the alumina support is in the range of 0.07% to 0.65% by weight with respect to the total support weight.

5. A catalyst according to claim 1, in which the sulphur content in the alumina support is in the range of 530 to 1150 ppm by weight with respect to the total support weight.

6. A catalyst according to claim 3, in which the sulphur content in the alumina support is in the range of 550 to 1100 ppm by weight with respect to the total support weight.

7. A catalyst according to claim 3, in which the sulphur content in the alumina support is in the range of 580 to 1050 ppm by weight with respect to the total support weight.

8. A catalyst according to claim 4, in which the sulphur content in the alumina support is in the range of 580 to 950 ppm by weight with respect to the total support weight.

9. A catalyst according to claim 1, in which the platinum content with respect to the total catalyst weight is in the range of 0.02% to 2% by weight.

10. A catalyst according to claim 1, in which the halogen content is in the range of 0.1% to 15% by weight with respect to the total catalyst weight.

11. A catalyst according to claim 1, in which the halogen is chlorine and its content is in the range of 0.5% to 2% by weight with respect to the total catalyst weight.

12. A catalyst according to claim 2, having a dopant metal contents in the range of 0 to 2% by weight with respect to the total catalyst weight.

13. A catalyst according to claim 1, in which the quantity of each promoter metal is in the range of 0.02% to 10% by weight with respect to the total catalyst weight.

14. A catalytic reforming process in which the catalyst according to claim 1 is brought into contact with a hydrocarbon feed comprising n-paraffinic, naphthenic and aromatic hydrocarbons.

15. A process for the manufacture of a reforming catalyst according to claim 1, comprising preparing said reforming catalyst by combining an alumina support with a low sulphur and phosphorus content with a metallic and acidic function, wherein the phosphorous content in said support is in the range 0.04% to 1% by weight with respect to the total support weight, and the sulphur content in said support is in the range 500 to 1200 ppm by weight with respect to the total support weight.

16. A reforming catalyst according to claim 1, wherein the at least one alumina support having a low sulfur and phosphorus content is produced as follows:
 (a) providing a phosphorus-containing solution and a sulfur-containing solution and a precipitate of an alumina precursor;

(b) impregnating the alumina precursor with a solution of a sulfur compound and a solution of a phosphorus compound;
(c) shaping a resultant alumina precursor comprising sulfur and phosphorous;
(d) calcining the resultant shaped alumina precursor.

17. A reforming catalyst according to claim 16, wherein said alumina precursor comprising sulfur and phosphorus is calcined at a temperature in the range of 500° C. to 830° C.

18. A reforming catalyst according to claim 16, wherein the sulfur-containing solution is a solution of $H_2SO_4$ or $Na_2SO_4$ or $K_2SO_4$.

19. A reforming catalyst according to claim 16, wherein the aqueous solution of a phosphorous compound comprises a solution of $H_3PO_4$, $(NH_4)_2HPO_4$, $Na_2HPO_4$, or $Na_3PO_4$.

20. A reforming catalyst according to claim 18, wherein the aqueous solution of a phosphorous compound comprises a solution of $H_3PO_4$, $(NH_4)_2HPO_4$, $Na_2HPO_4$, or $Na_3PO_4$.

21. A reforming catalyst according to claim 1, wherein the support having a low sulfur and phosphorous content has a specific surface area of 160 to 250 m2/g, a volume of pores with a diameter of less than 10 microns, of 0.4 to 0.9 cc/g and a mean diameter of pores with a diameter between 2 and 50 nm in the range of 7 to 16 nm.

22. A reforming catalyst according to claim 1, wherein the phosphorous is incorporated in only the alumina support.

* * * * *